United States Patent
Wang (10) Patent No.: US 8,313,074 B2
(45) Date of Patent: Nov. 20, 2012

(54) SUPPORT STAND FOR FLAT-PANEL DISPLAY MONITOR

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 443 days.

(21) Appl. No.: 12/344,667

(22) Filed: Dec. 29, 2008

(65) Prior Publication Data

US 2010/0008032 A1 Jan. 14, 2010

(30) Foreign Application Priority Data

Jul. 11, 2008 (CN) .......................... 2008 1 0302710

(51) Int. Cl.
*A47F 1/10* (2006.01)
(52) U.S. Cl. .................... 248/295.11; 248/157; 248/919
(58) Field of Classification Search .................. 248/157, 248/176.3, 414, 420, 917, 918, 919, 920, 248/161, 295.11, 412, 274.1, 125.1, 424, 248/287.1; 361/679.56, 679.26
See application file for complete search history.

(56) References Cited

U.S. PATENT DOCUMENTS

| | | | |
|---|---|---|---|
| 6,782,242 B1 * | 8/2004 | Koleda et al. | 455/90.3 |
| 7,424,991 B2 * | 9/2008 | Kim et al. | 248/125.9 |
| 2004/0118984 A1 | 6/2004 | Kim et al. | |
| 2005/0145762 A1 * | 7/2005 | Sweere et al. | 248/157 |
| 2006/0176654 A1 * | 8/2006 | Kfoury | 361/681 |
| 2007/0102600 A1 * | 5/2007 | Ishizaki et al. | 248/176.3 |

FOREIGN PATENT DOCUMENTS

CN 1488055 A 4/2004

* cited by examiner

*Primary Examiner* — Terrell McKinnon
*Assistant Examiner* — Eret McNichols
(74) *Attorney, Agent, or Firm* — Altis Law Group, Inc.

(57) ABSTRACT

A support stand for a flat-panel display monitor, includes a base member and an elevating mechanism positioned on the base member. The elevating mechanism includes a support bracket including base portion, an elevating member slidably connected to the support bracket, a pair of guiding members fixed on the support bracket, a pair of rollable members connected to opposite sides of the elevating member, and a resilient member. Each guiding member includes a guiding surface and a distance between the guiding surfaces decreases from an upper end to a lower end of each guiding member. The rollable members move along the guiding surface. The resilient member is positioned between the rollable members to push the rollable members to press the guiding surfaces.

16 Claims, 10 Drawing Sheets

SUPPORT STAND FOR FLAT-PANEL DISPLAY MONITOR

BACKGROUND

1. Technical Field

The present disclosure generally relates to support stands and, particularly, to a support stand for a flat-panel display monitor.

2. Description of the Related Art

Figure 10:
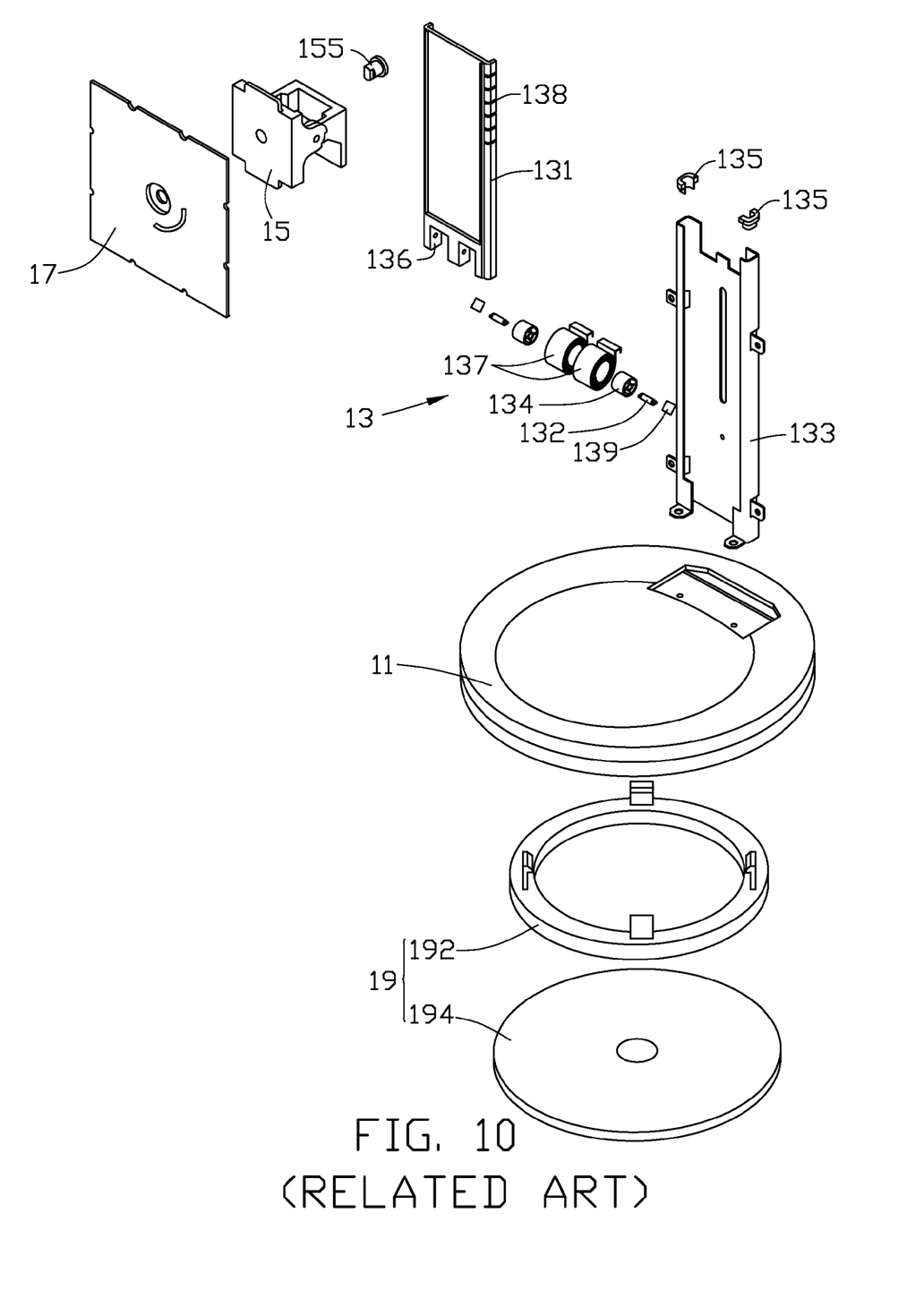
FIG. 10 is an exploded, isometric view of a typical support stand.

Referring to FIG. 10, a typical support stand for a flat-panel display monitor, such as a liquid crystal display monitor, generally includes a base member 11, an elevating mechanism 13, a rotatable bracket 15, and a mounting bracket 17. The mounting bracket 17 attaches to the flat-panel display monitor. The rotatable bracket 15 connects the mounting bracket 17 and the elevating mechanism 13. The elevating mechanism 13 is positioned on the base member 11.

The elevating mechanism 13 includes an elevating member 131, two pivot shafts 132, a support member 133, two mounting barrels 134, two guiding members 135, and two coiled springs 137. The elevating member 131 includes two mounting portions 136 formed at an end and defines a plurality of oil grooves 138 in opposite side portions of the elevating member 131. The oil grooves 138 store lubricating oil. The support member 133 defines two guide grooves (not labeled) at opposite sides to receive the side portions of the elevating member 13. Each coiled spring 137 includes a coiled portion (not labeled) and a free portion (not labeled) connecting to the coiled portion.

To assemble the elevating mechanism 13, the guiding members 135 are sleeved on the opposite side portions of the elevating member 131. The opposite side portions of the elevating member 131 together with the guiding members 135 are slidably received in the guide grooves of the support member 133. Thus, the elevating member 131 is slidable relative to the support member 133. The coiled portion of each coiled spring 137 is sleeved on each of the mounting barrels 134, and the free portion of each coiled spring 137 is fixed to the support member 133. Each of the pivot shafts 132 is passed through each of the mounting barrels 134 and fixed to each of the mounting portions 136 of the elevating member 131.

The mounting bracket 17 is rotatably connected to the rotatable bracket 15 by a pivot shaft 155 so that the flat-panel display monitor is rotatable with the mounting bracket 17. The viewing angle of the flat-panel display monitor can be adjusted by rotating the rotatable bracket 15 relative to the elevating mechanism 13. The height of the flat-panel display monitor can be adjusted by the elevating mechanism 13.

The support stand further includes a rotatable mechanism 19. The rotatable mechanism 19 includes a rotatable member 192 and a support base 194. An upper surface of the rotatable member 192 is fixed to the base member 11 and a bottom surface of the rotatable member 192 is rotatably mounted on the support base 194. Thus, the rotatable member 192 can be rotated with the base member 11 relative to the support base 194, that is, the flat-panel display monitor can be rotated relative to the support base 194.

However, when the elevating member 131 slides in the guide grooves of the support member 133, a high friction may be created between the elevating member 131 and the support member 133. As a result, a user may need to exert great effort on the flat-panel display monitor in order to be able to lift the flat-panel display monitor with the elevating member 131 to slide in the guide grooves of the support member 133.

Therefore, a new support stand for a flat-panel display monitor is desired in order to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
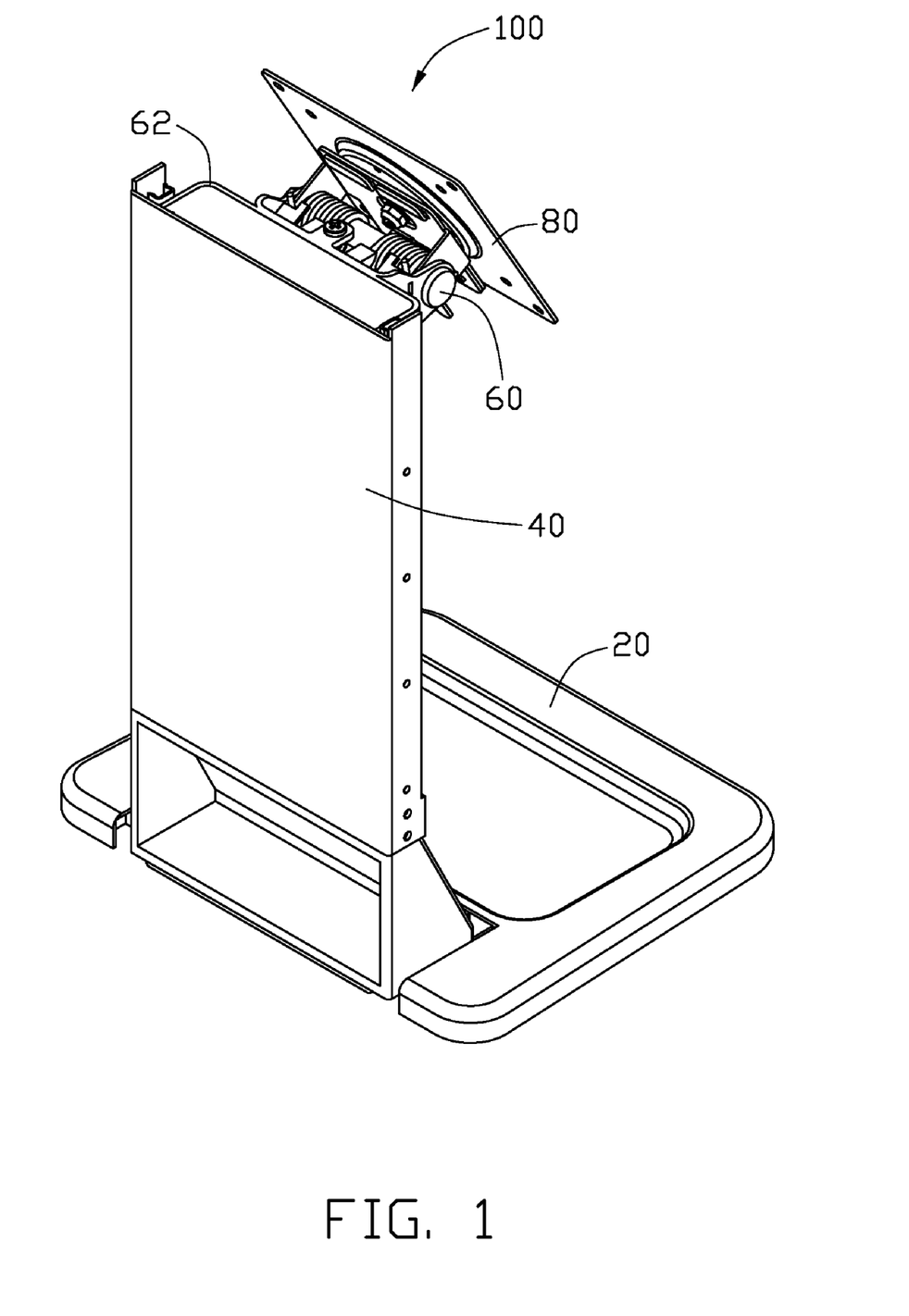
FIG. 1 is an assembled, isometric view of one embodiment of a support stand, the support stand including an elevating mechanism and a first embodiment of a support bracket.
Figure 2:
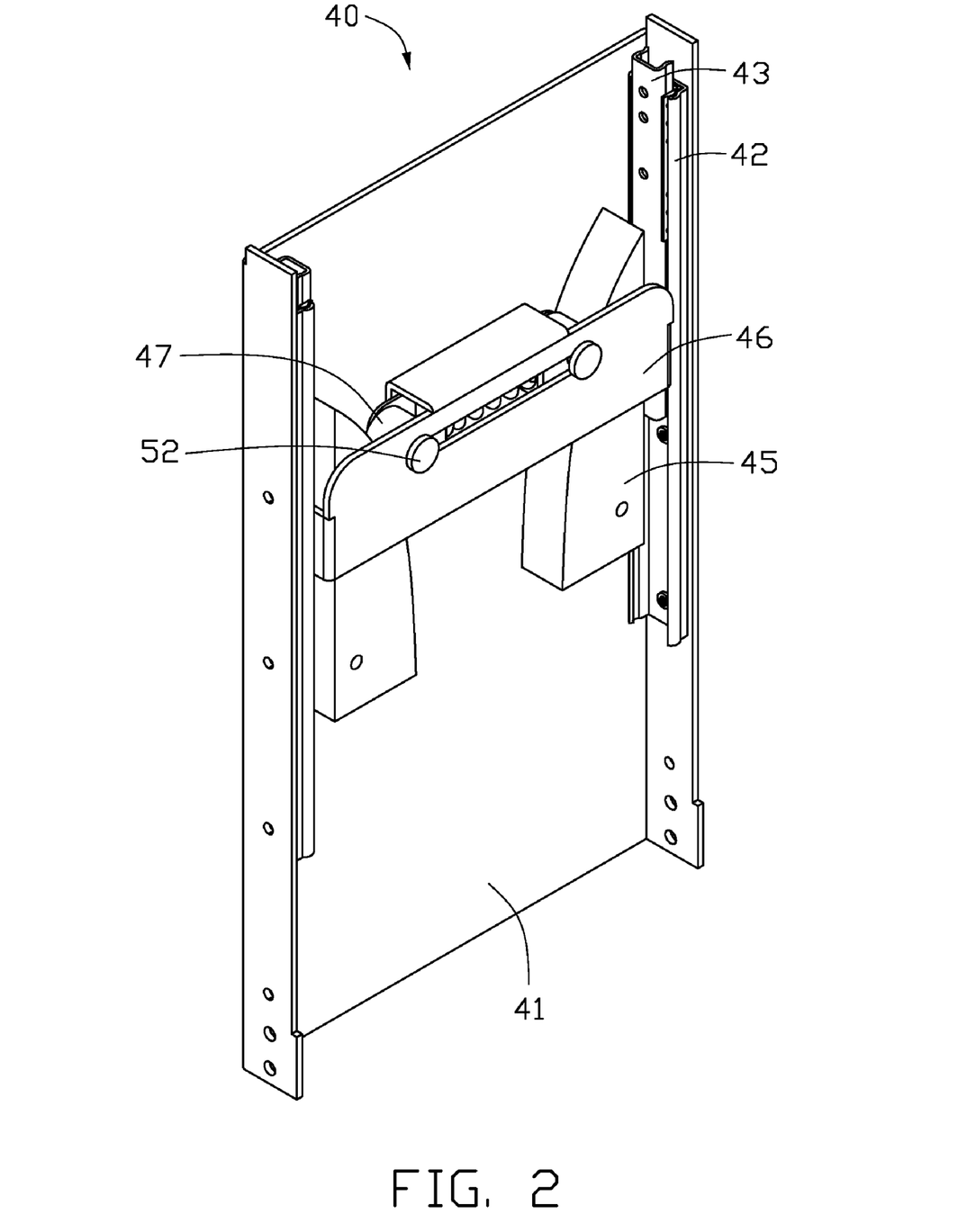
FIG. 2 is an assembled, isometric view of the elevating mechanism in FIG. 1, the elevating mechanism including guiding members.

Referring to FIGS. 1 and 2, one embodiment of a support stand 100 includes a base member 20, an elevating mechanism 40, a rotatable mechanism 60, and a mounting bracket 80. A first end of the elevating mechanism 40 is positioned on the base member 20. The rotatable mechanism 60 includes a link bracket 62 connecting the mounting bracket 80 to a second end of the elevating mechanism 40. The rotatable mechanism 60 may be rotatable relative to the elevating mechanism 40. The mounting bracket 80 is configured to be mounted to a flat-panel display monitor (not shown).

Figure 3:
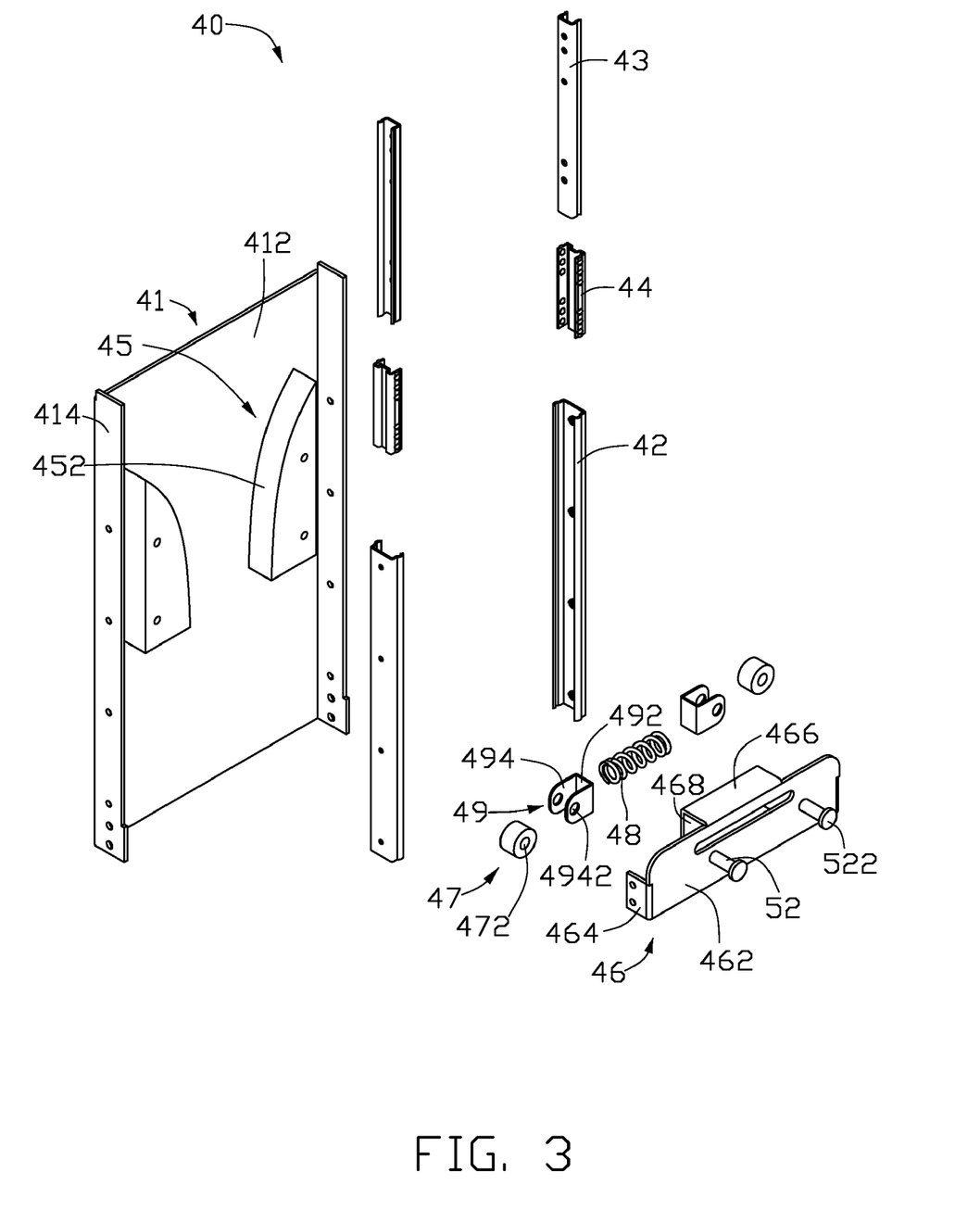
FIG. 3 is an exploded, isometric view of the elevating mechanism in FIG.2.
Figure 4:
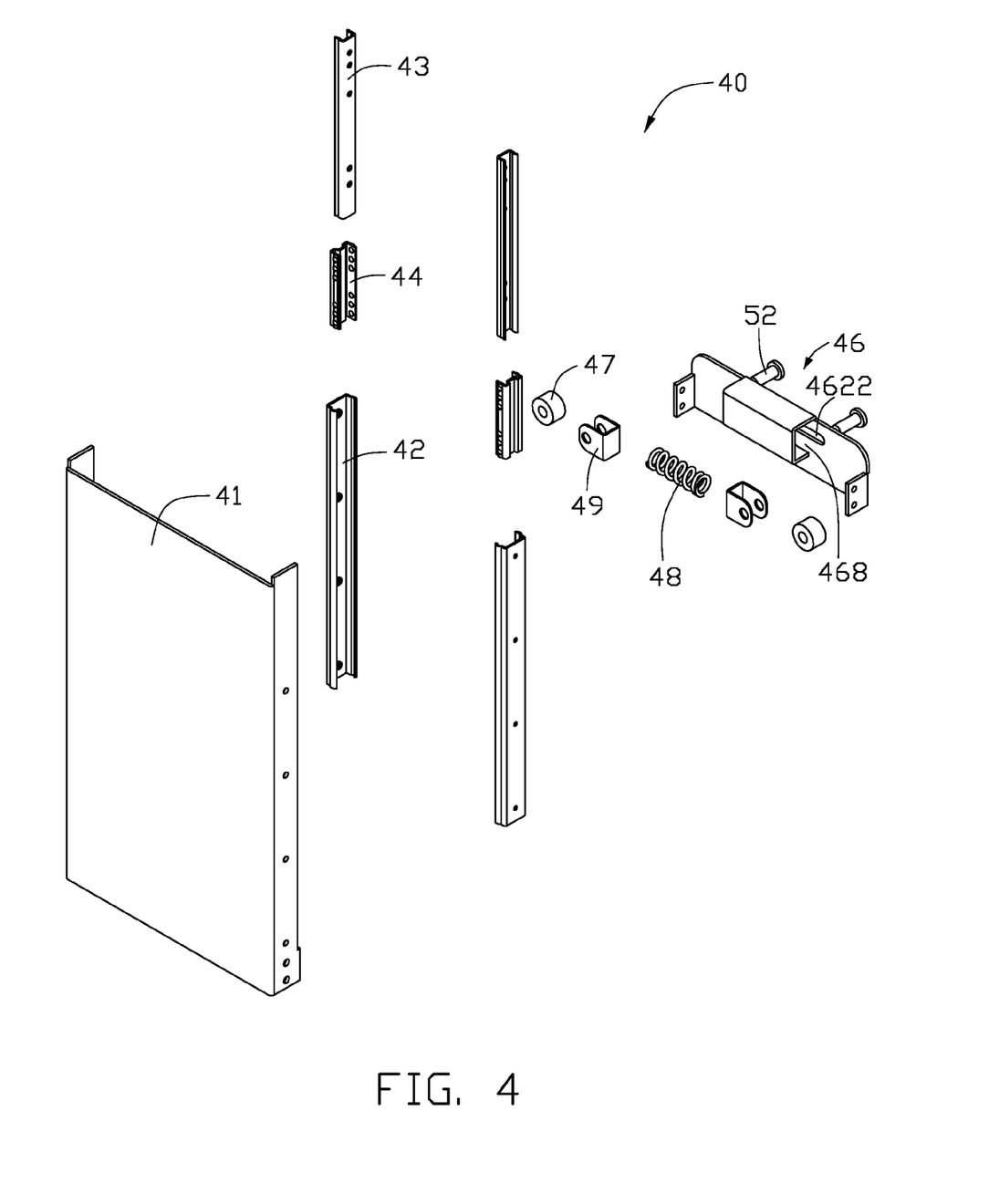
FIG. 4 is similar to FIG.3, but viewed from another aspect.

Referring to FIGS. 3 and 4, the elevating mechanism 40 includes a support bracket 41, a pair of outer guiding rails 42, a pair of inner guiding rails 43, a pair of ball bearing brackets 44, a pair of guiding members 45, an elevating member 46, a pair of rollable members 47, a resilient member 48, a pair of protecting members 49, and two pivot shafts 52.

The support bracket 41 includes a substantially rectangular base portion 412 and two side walls 414 extending substantially perpendicularly from opposite sides of the base portion 412. The outer guiding rails 42 are substantially rectangular and fixed to the side walls 414 of the support bracket 41. The inner guiding rails 43 are similar to the outer guiding rails 42, and slidably engage in the outer guiding rails 42. Each ball bearing bracket 44 includes a plurality of balls (not labeled) positioned on opposite sides of each ball bearing bracket 44. Each ball bearing bracket 44 is positioned between each outer guiding rail 42 and each inner guiding rail 43, thereby decreasing a friction between each outer guiding rail 42 and each inner guiding rail 43.

The guiding members 45 are fixed on the base portion 412. Each guiding member 45 includes a guiding surface 452. The guiding surface 452 is a substantially curved surface and a distance between the guiding surfaces 452 of guiding members 45 decreases from an upper end to a lower end of each guiding member 45.

The elevating member 46 includes a base wall 462, two side walls 464 extending substantially perpendicularly out from opposite ends of the base wall 462, a receiving portion 466 extending from a middle portion of the base wall 462. The base wall 462 defines a connecting groove 4622 adjacent to the receiving portion 466. The side walls 464 are fixed to the inner guiding rails 43. The receiving portion 466 defines a receiving chamber 468 communicating with the connecting groove 4622.

Each rollable member 47 is substantially column shaped and defining a substantially circular pivot hole 472 in a middle portion of the rollable member 47. Each protecting member 49 includes a base portion 492 and two connecting pieces 494 extending substantially perpendicularly from opposite sides of the base portion 492. The base portion 492 and the connecting pieces 494 cooperatively define a receiving space (not labeled) to receive the rollable member 47. Each connecting piece 494 defines a pivot hole 4942 corresponding to the pivot hole 472 of the rollable member 47. The resilient member 48 may be a compression helical spring or other resilient members such as a leaf spring, or a rubber rod. The pivot shafts 52 is a substantially cylindrical pin including a head portion 522. The head portion 522 may also be cylindrical shaped with a diameter larger than a height of the connecting groove 4622 of the elevating member 46.

Figure 5:
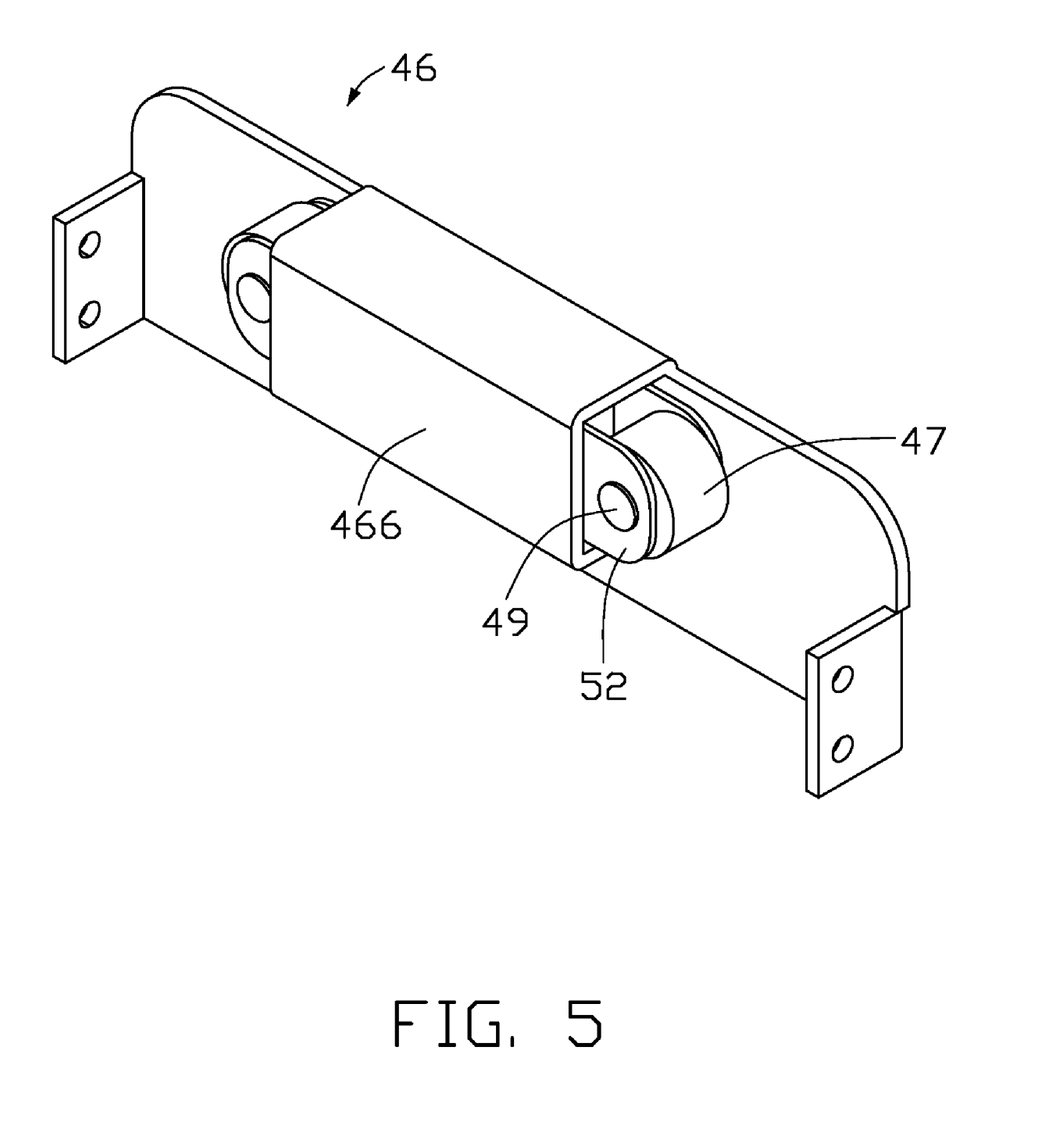
FIG. 5 is an assembled, isometric view of a portion of the elevating mechanism in FIG. 2.

Referring to FIG. 5, the rollable members 47 are received in the receiving spaces of the protecting members 49. The protecting members 49 with the rollable members 47 are partially received in the receiving chamber 468 of the elevating member 46. One pivot shaft 52 is passed through the connecting groove 4622 of one elevating member 46, one of the pivot holes 4942 of one protecting member 49, the pivot hole 472 of one rollable member 47, and fixed to another one of the pivot holes 4942 of one protecting member 49 in order. Thus, the rollable member 47 is rotatable relative to the protecting member 49. The resilient member 48 is positioned between the pair of protecting members 49, with opposite ends of the resilient member 48 abutting the base portions 492 of the protecting members 49. The other pivot shaft 52 is passed through the connecting groove 4622 of the other elevating member 46, one of the pivot holes 4942 of the other protecting member 49, the pivot hole 472 of the other rollable member 47, fixed to another one of the pivot holes 4942 of the other protecting member 49 in order. Therefore, the rollable members 47, the resilient member 48, and the protecting members 49 cooperatively form a resilient module (not labeled).

Referring to FIG. 2 again, the inner guiding rails 43 slidably engage in the outer guiding rails 42, with the ball bearing bracket 44 positioned between the outer guiding rails 42 and the inner guiding rails 43. Each outer guiding rail 42 is fixed to the corresponding side wall 414 of the support bracket 41. The guiding members 452 are fixed on the base portion 412 of the support bracket 41 and positioned between the inner guiding rails 43. The receiving portion 466 of the elevating member 46 is positioned between the guiding members 452, with the rollable members 47 abutting the guiding surface 452 of the guiding members 452. Finally, each side wall 464 of the elevating member 46 is fixed to the corresponding inner guide rail 43 to form the elevating mechanism 40.

The support stand 100 is first formed by fixing a lower end of the support bracket 41 to the base member 20. The rotatable mechanism 60 is fixed to an upper end of each inner guiding rail 43 via the connecting bracket 62 such that the rotatable mechanism 60 can slide with the inner guiding rail 43 relative to the outer guiding rails 42. Finally, the mounting bracket 80 is rotatably connected to the rotatable mechanism 60, and the flat-panel display monitor is fixed on the mounting bracket 80.

Referring to FIGS. 1 and 2, the flat-panel display monitor can be raised or lowered with the rotatable mechanism 60 and the mounting bracket 80, when the inner guiding rails 43 slide along the outer guiding rails 42. To lower a height of the flat-panel display monitor, an external force is applied on the flat-panel display monitor, thereby pressing the inner guiding rails 43 to slide downwards with the elevating member 46 along the outer guiding rails 42. When the elevating member 46 moves downwards, the rollable members 47 rotate along the guiding surface 452 of the guiding members 452 and the pivot shafts 52 slide close to each other along the connecting groove 4622 of the elevating member 46. As a result, a distance between the rollable members 47 gradually decreases. Simultaneously, the resilient member 48 gradually compresses so that an elastic force created by the resilient member 48 gradually increases. Therefore, a friction created between the rollable members 47 and the guiding surface 452 of the guiding members 452, and a supporting force created by the guiding member 45, gradually increases. When the elevating member 46 slides to a predetermined position, the external force is released. The flat-panel display monitor with the inner guiding rails 43 and the elevating member 46 remain in the predetermined position by the supporting force of the guiding member 45, the friction between the movable members 39 and the support members 341, and a friction created between the inner guiding rails 43 and the outer guiding rails 42. Similarly, to raise the height of the flat-panel display monitor, another external force is applied on the flat-panel display monitor lifting the inner guiding rails 43 with the elevating member 46 to slide upwards relative to the outer guiding rails 42 to another predetermined position.

Since the guiding member 45 includes a curved guiding surface 452 to provide the supporting force, the fiction between other components needed to counter the gravity of the flat-panel display monitor and the inner guiding rails can be greatly decreased. Thus, the friction created between the inner guiding rails 43 and the outer guiding rails 44 is quite small. As a result, the flat-panel display monitor can be raised easily. When lowering the height of the flat-panel display monitor, a friction created between the rollable members 47 and the guiding surface 452 of the guiding members 45, and a supporting force created by the guiding member 45, gradually increases, thereby preventing the flat-panel display monitor from being dropped too rapidly.

Figure 6:
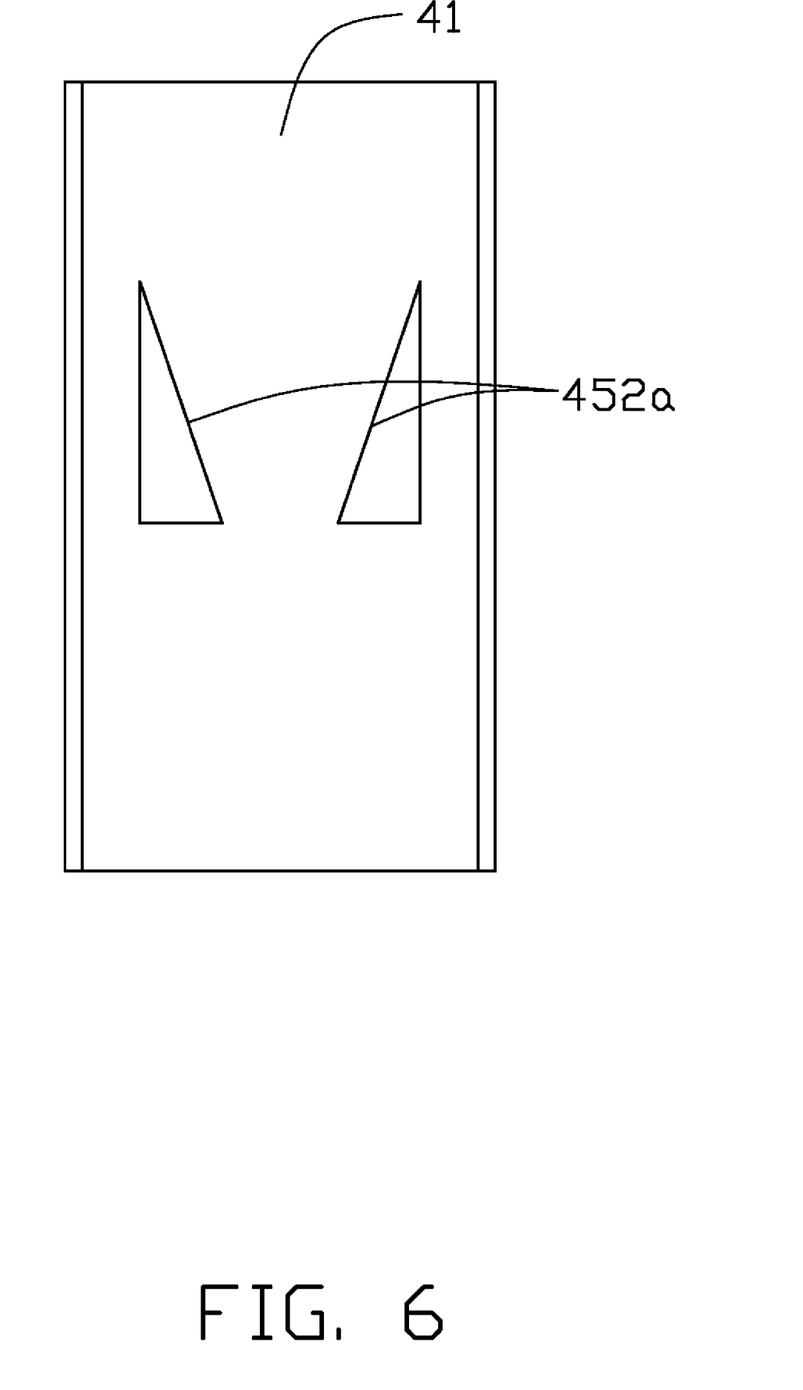
FIG. 6 is a plan view of a second embodiment of a support bracket of the elevating mechanism, mounted with guiding members.
Figure 7:
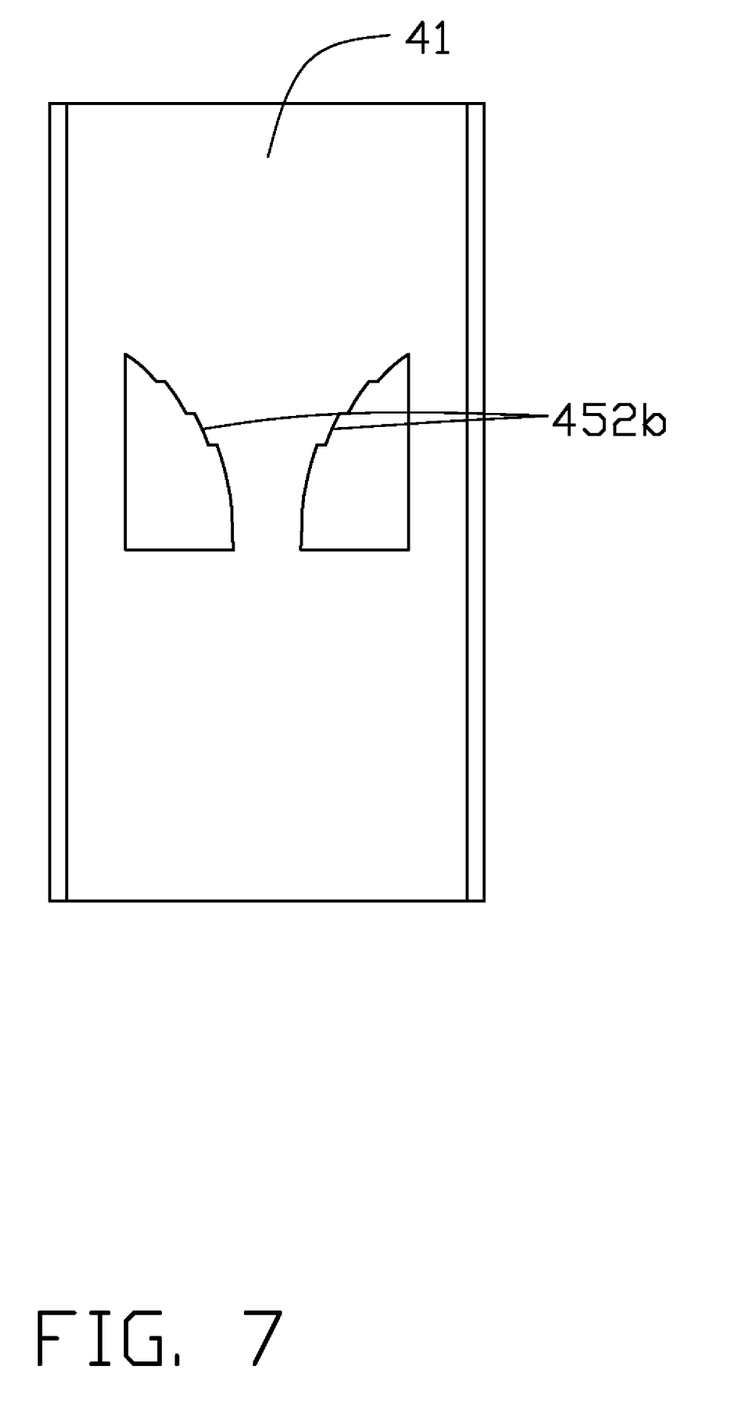
FIG. 7 is a plan view of a third embodiment of a support bracket of the elevating mechanism, mounted with guiding members.
Figure 8:
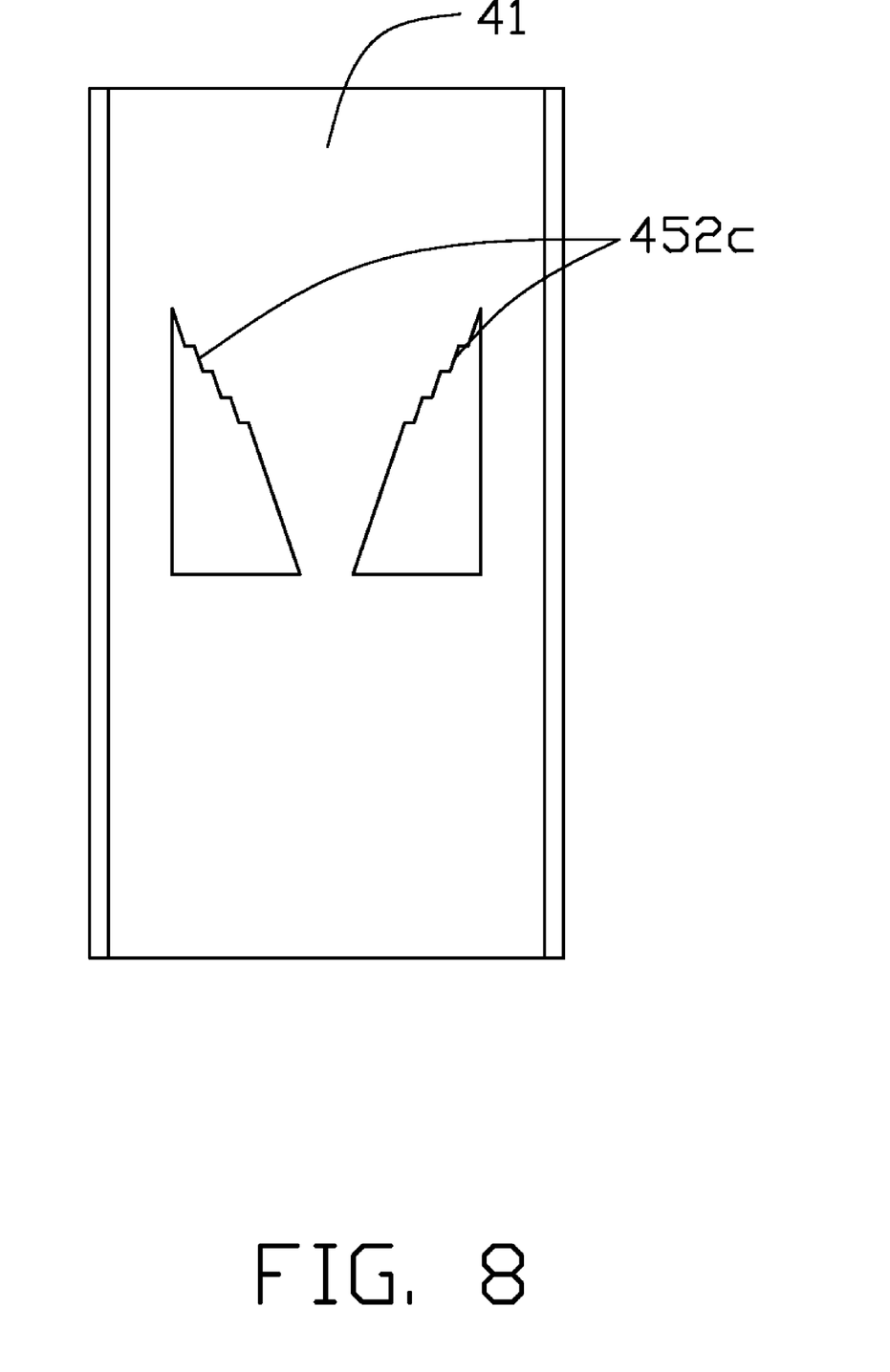
FIG. 8 is a plan view of a fourth embodiment of a support bracket of the elevating mechanism, mounted with guiding members.
Figure 9:
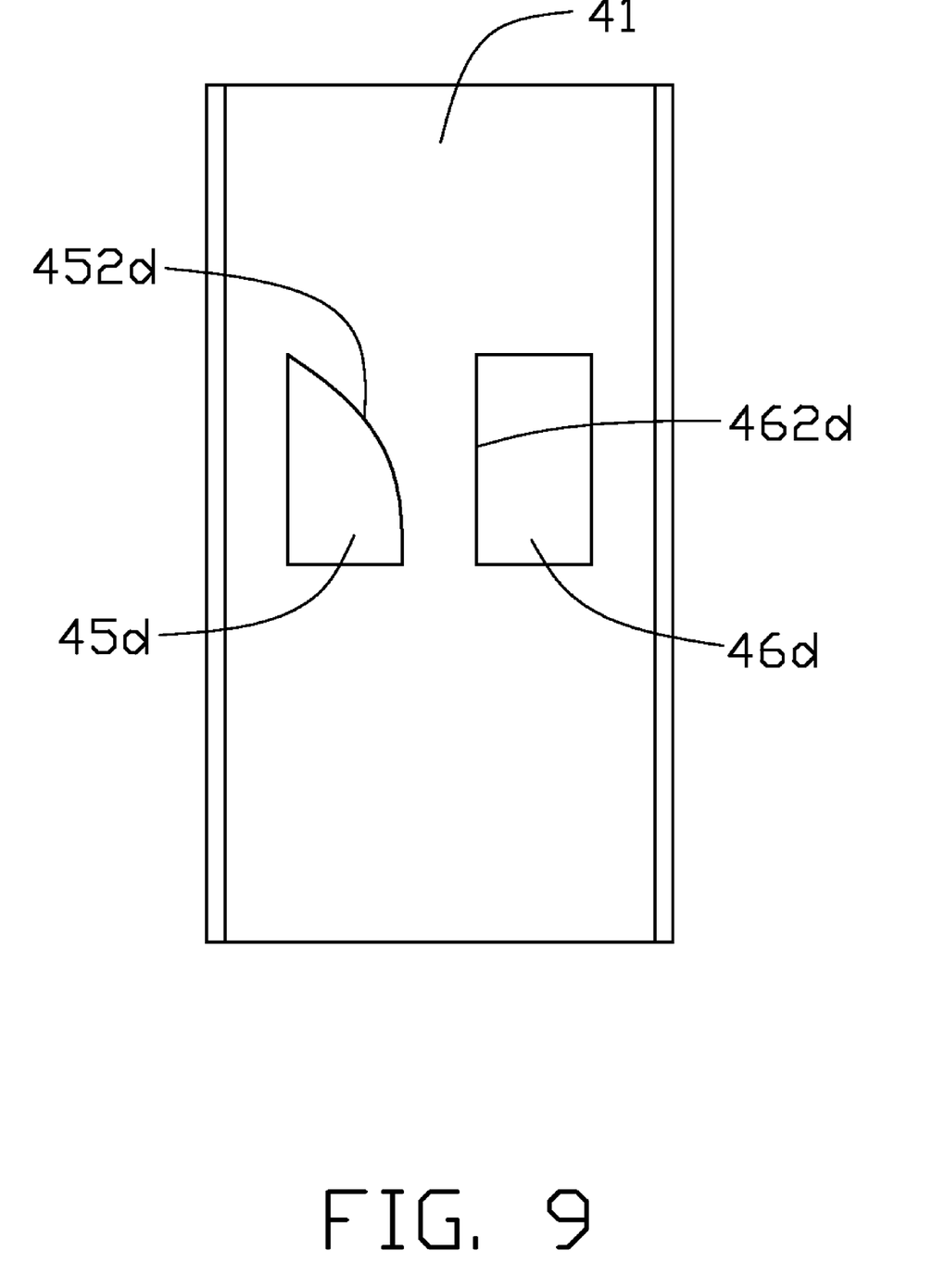
FIG. 9 is a plan view of a fifth embodiment of a support bracket of the elevating mechanism, mounted with guiding members.

The distance between the guiding surfaces 452 of the guiding members 45 decreases from an upper end to a lower end of each guiding member 45. Thus, a side of each guiding surface 52 may take a shape of a slanted line 452a as shown in FIG. 6, a stepped curved line 452b as shown in FIG. 7, or a stepped slanted line 452c as shown in FIG. 8. Alternatively, referring to FIG. 9, a side of a first guiding surface 45d is shaped as a curved line 452d and a side of a second guiding surface 46d is shaped as a beeline 462d. The guiding member 45 may be integrally formed with the support bracket 41.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A support stand for a flat-panel display monitor, comprising:
   a base member;
   an elevating mechanism positioned on the base member, comprising:
      a support bracket including a base portion;
      an elevating member slidably connected to the support bracket, the elevating member comprising a base wall and a receiving portion extending from a middle portion of a top end of the base wall at an edge of the top end; the receiving portion and the base wall cooperatively defining a receiving chamber, the base wall defining a connecting groove communicating with the receiving chamber and positioned adjacent to the top end of the base wall along a direction parallel to the edge of top end of the base wall and perpendicular to a sliding direction of the elevating member;
      a pair of guiding members fixed on the support bracket, each guiding member comprising a guiding surface, wherein a distance between the guiding surfaces decreases from an upper end to a lower end of each guiding member;
      two protecting members slidably connected to opposite sides of the elevating member and partially received in two ends of the receiving chamber of the elevating member;
      two pivot shafts passing through the connecting groove of the elevating member and assembled with the two protecting members, the pivot shafts being slidable along the connecting groove;
      a pair of rollable members rotatably received in the two protecting members via the two pivot shafts, respectively, and positioned between the pair of guiding members, to move along the guiding surfaces downwards and upwards; and
      a resilient member received in the receiving chamber and positioned between the pair of protecting members, with opposite ends of the resilient member abutting the two protecting members for pushing the rollable members to press the guiding surfaces, such that a supporting force is created by the guiding surfaces of the two guiding members upwardly for maintaining the elevating member together with the flat-panel display monitor to be remaining at a predetermined position, and a friction is created between the guiding surfaces and the rollable members for preventing the elevating member together with the flat-panel display monitor from being dropped;
      wherein, when the elevating member moves downwards, the rollable members rotate along the guiding surface of the guiding member and slide close to each other along the connecting groove of the elevating member.

2. The support stand of claim 1, wherein the resilient member is a compression spring.

3. The support stand of claim 1, wherein each protecting member comprises a base portion and two connecting pieces extending from opposite sides of the base portion; each rollable member is positioned between the connecting pieces of each protecting member; each pivot shaft is passed through the connecting groove to rotatably connect each rollable member and each protecting member; the base portions of the protecting members abut opposite ends of the resilient member.

4. The support stand of claim 3, wherein each rollable member defines a pivot hole, each connecting piece of the protecting member defines a pivot hole, each pivot shaft comprises a head portion formed at a first end thereof; a second end of each pivot shaft opposite to the first end is passed through the connecting groove, one of the pivot holes of each protecting member, the pivot hole of each rollable member, and the other one of the pivot holes of each protecting member.

5. The support stand of claim 3, wherein the elevating mechanism comprises a pair of outer guiding rails and a pair of inner guiding rails slidably engaging in the outer guiding rails, wherein the support bracket further comprises two side walls extending substantially perpendicularly from opposite sides of the base portion; each outer guiding rail is fixed to each side wall of the support bracket; the elevating member comprises two side walls extending substantially perpendicularly from opposite ends of the base wall; the inner guiding rails are fixed to the side walls the elevating member.

6. The support stand of claim 5, further comprising a pair of ball bearing brackets positioned between the outer guiding rails and the inner guiding rails to decrease a friction between the outer guiding rails and the inner guiding rails.

7. The support stand of claim 1, wherein each guiding surface is a curved surface.

8. An elevating mechanism, comprising:
   a support bracket including a base portion; and
   an elevating member slidably connected to the support bracket, the elevating member comprising a base wall and a receiving portion extending from a middle portion of a top end of the base wall at an edge of the top end; the receiving portion and the base wall cooperatively defining a receiving chamber, the base wall defining a connecting groove communicating with the receiving chamber and positioned adjacent to the top end of the base wall along a direction parallel to the edge of top end of the base wall and perpendicular to a sliding direction of the elevating member;
   a pair of guiding members fixed on the support bracket, each guiding member comprising a guiding surface, wherein a distance between the guiding surfaces decreases from an upper end to a lower end of each guiding member;
   two protecting members slidably connected to opposite sides of the elevating member and partially received in two ends of the receiving chamber of the elevating member;
   two pivot shafts passing through the connecting groove of the elevating member and assembled with the two protecting members, the pivot shafts being slidable along the connecting groove;
   a pair of rollable members rotatably received in the two protecting members via the two pivot shafts, respectively, and positioned between the pair of guiding members, to move along the guiding surfaces downwards and upwards; and
   a resilient member received in the receiving chamber and positioned between the pair of protecting members, with opposite ends of the resilient member abutting the two protecting members for pushing the rollable members to press the guiding surfaces, such that a supporting force is created by the guiding surfaces of the two guiding members upwardly for maintaining the elevating member together with the flat-panel display monitor to be remaining at a predetermined position, and a friction is created between the guiding surfaces and the rollable members for preventing the elevating member together with the flat-panel display monitor from being dropped; wherein, when the elevating member moves downwards, the rollable members rotate along the guiding surface of the guiding member and slide close to each other along the connecting groove of the elevating member.

9. The elevating mechanism of claim 8, wherein the resilient member is a compression spring.

10. The elevating mechanism of claim 8, wherein each protecting member comprises a base portion and two connecting pieces extending from opposite sides of the base portion; each rollable member is positioned between the connecting pieces of each protecting member; each pivot shaft is passed through the connecting groove to rotatably connect each rollable member and each protecting member; the base portions of protecting members abut opposite ends of the resilient member.

11. The elevating mechanism of claim 10, wherein each rollable member defines a pivot hole; each connecting piece of the protecting member defines a pivot hole; each pivot shaft comprises a head portion formed at a first end thereof; a second end of each pivot shaft opposite to the first end is passed through the connecting groove, one of the pivot holes of each protecting member, the pivot hole of each rollable member, and the other one of the pivot holes of each protecting member.

12. The elevating mechanism of claim 10, further comprising a pair of outer guiding rails and a pair of inner guiding rails slidably engaging in the outer guiding rails, wherein the support bracket further comprises two side walls extending substantially perpendicularly from opposite sides of the base portion; each outer guiding rail is fixed to each side wall of the support bracket; the elevating member comprises two side walls extending substantially perpendicularly from opposite ends of the base wall, and the inner guiding rails are fixed to the side walls the elevating member.

13. The elevating mechanism of claim 12, further comprising a pair of ball bearing brackets positioned between the outer guiding rails and the inner guiding rails for decreasing a friction between the outer guiding rails and the inner guiding rails.

14. The elevating mechanism of claim 8, wherein each guiding surface is a curved surface.

15. The elevating mechanism of claim 8, wherein a side of each guiding surface is shaped as one of a slanted line, a stepped curved line, and a stepped line.

16. The elevating mechanism of claim 8, wherein a side of a first of the guiding surfaces is a curved line and a side of a second of the guiding surfaces is a beeline.

* * * * *